Jan. 27, 1931.  F. VON KAENEL  1,790,126
TOY SLED
Filed Aug. 2, 1929   2 Sheets-Sheet 1
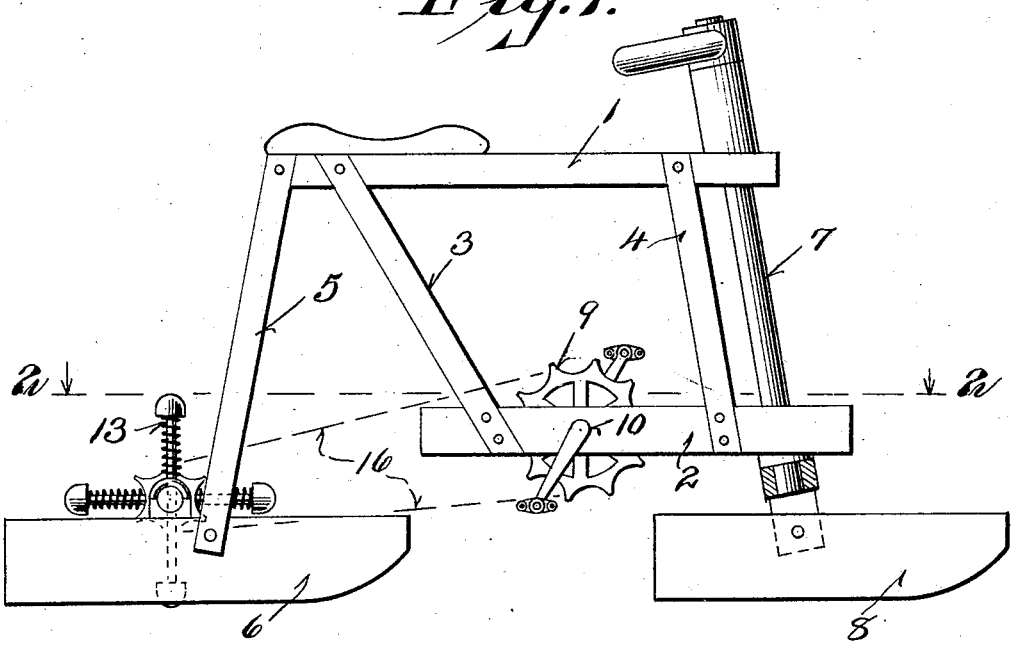
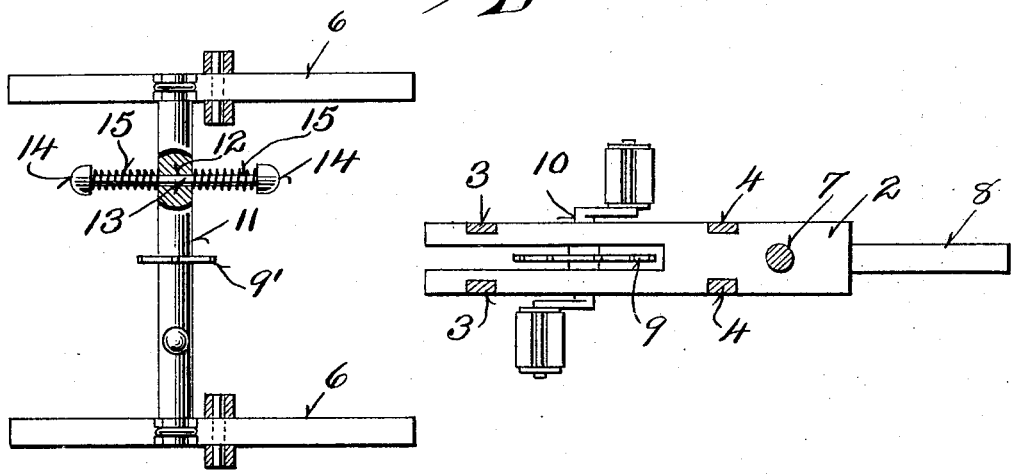

Jan. 27, 1931.  F. VON KAENEL  1,790,126
TOY SLED
Filed Aug. 2, 1929  2 Sheets-Sheet 2

Inventor
F. von Kaenel

Patented Jan. 27, 1931

1,790,126

UNITED STATES PATENT OFFICE

FRITZ von KAENEL, OF MILWAUKEE, WISCONSIN

TOY SLED

Application filed August 2, 1929. Serial No. 382,881.

This invention refers to toy sleds and it has for its object to provide a simple and cheaply constructed sled which can be steered and propelled by the feet of the rider.

With the above object in view, the invention consists in certain particulars of construction and combinations of parts, as will be hereinafter fully set forth with reference to the accompanying drawings and subsequenting claim.

In the drawings, Figure 1 represents a side elevation of a sled embodying the features of my invention;

Figure 2 is a sectional plan view of the same, the section being indicated on line 2—2 of Figure 1;

Figure 3:
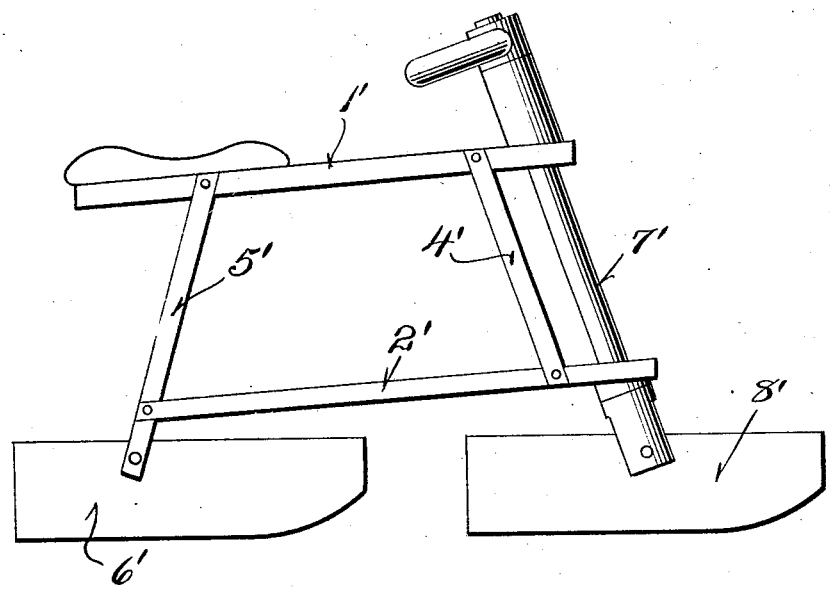
Figure 3 is a side elevation of a modified form of the sled.

Referring by character to the drawings, the numeral 1 represents a top strut, and 2 a bottom strut of a skeleton frame, the frame being built up from wood strips. The struts 1 and 2 are connected by means of brace bars 3 and 4 and the upper strut has depending therefrom a pair of legs 5 which have secured to their lower spaced ends the rear runners 6—6.

The struts 1 and 2, at their front ends, are formed with bearings for the reception of a steering post 7, which steering post carries at its lower end a steering runner 8, the same being pivoted in the bifurcated end of the post 7 to permit rocking and at the same time the bifurcation prevents lateral movement of the runners.

The lower strut 2, as best shown in Figure 2, is forked at its rear end for the reception of a driving sprocket 9, the sprocket being secured to a pedal shaft 10 which is mounted in apertures, formed in the forked ends in said strut 2.

Upon the rear runners is a hub 11, having staggered apertures 12, extending therethrough for the reception of spokes 13, which are adapted to reciprocate back and forth with relation to the hub.

These spokes have mounted at their ends traction feet 14, and between the feet and the hub are interposed coil springs 15, whereby the spoke members are held in a normal position but will permit yielding of the same in either direction when the hub is rotated.

Centrally secured to the hub 11 is a sprocket wheel 9', which sprocket wheel has a chain belt connection with the sprocket wheel 9, the chain being indicated by a dotted line 16 in Figure 1 of the drawings.

Figure 4:
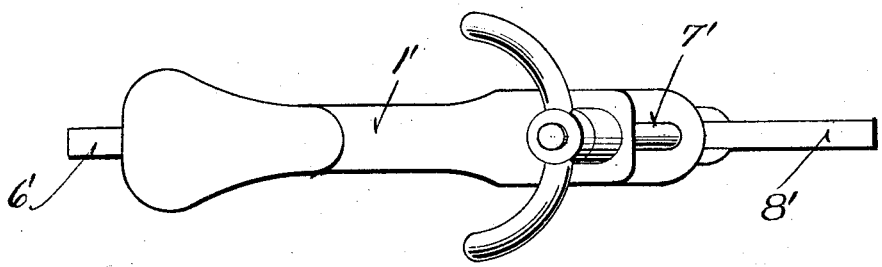
Figure 4 is a plan view of the same.

Referring especially to Figures 3 and 4, the lower strut 2' of the skeleton frame is extended back and connected to foot 5', which foot carries the single runner 6' and in this instance the steering rod 7' carries the front runner 8'. In this particular structure the sled as a whole may be propelled by the rider's feet, engaging the ground in place of the propelling mechanism shown in the other form of my invention.

I claim:

A toy sled having a skeleton frame having runners attached thereto and upper and lower front bearings, and a steering post mounted in the bearings carrying a front runner; the combination of a propelling device including a hub rotatably mounted upon the rear runners, radial spokes slidably mounted in the hub, traction feet carried by the spokes and coil springs interposed between the feet and the hub for centering said feet relative to the hub.

In testimony that I claim the foregoing I have hereunto set my hand at Milwaukee, in the county of Milwaukee and State of Wisconsin.

FRITZ Von KAENEL.